United States Patent

Raines

Patent Number: 5,297,874
Date of Patent: Mar. 29, 1994

[54] ELASTOMERIC BEARING

[75] Inventor: Kenneth W. J. Raines, Leicestershire, England

[73] Assignee: Dunlop Limited, a British Company, United Kingdom

[21] Appl. No.: 971,228

[22] Filed: Nov. 4, 1992

Related U.S. Application Data

[63] Continuation-in-part of Ser. No. 704,399, May 23, 1991, abandoned.

[30] Foreign Application Priority Data

Jan. 6, 1990 [GB] United Kingdom ............... 9012278

[51] Int. Cl.⁵ ................ F16C 27/06; F16M 13/00; F16F 7/00; B64C 11/12
[52] U.S. Cl. .................... 384/221; 248/603; 267/141.1; 416/134 A
[58] Field of Search ............ 384/221, 222, 215; 267/141.3, 141.1, 141.7; 416/134 R, 134 A; 464/94, 96; 248/603, 634, 632

[56] References Cited

U.S. PATENT DOCUMENTS

| | | | |
|---|---|---|---|
| 3,228,673 | 1/1966 | Hinks | 416/134 A |
| 3,504,902 | 4/1970 | Irwin | 464/94 X |
| 4,105,266 | 8/1978 | Finney | 384/221 |
| 4,123,815 | 11/1978 | Neff | 384/220 |
| 4,435,097 | 3/1984 | Peterson | 384/221 |
| 4,518,368 | 5/1985 | Peretti | 464/94 X |
| 4,734,081 | 3/1988 | Neathery et al. | 384/221 X |
| 4,765,758 | 8/1988 | O'Donnell et al. | 384/221 |

FOREIGN PATENT DOCUMENTS

804438 11/1958 United Kingdom .
1095598 12/1967 United Kingdom .

Primary Examiner—Thomas R. Hannon
Attorney, Agent, or Firm—Stevens, Davis, Miller & Mosher

[57] ABSTRACT

A heavy duty elastomeric bearing typically of annular shape comprises a pair of rigid end members spaced apart and interconnected by an element of elastomeric material having embedded therein a plurality of substantially rigid reinforcing interleaves each arranged to lie in respective planes generally parallel with confronting surfaces of the rigid members. One or more of the reinforcing interleaves lying substantially mid-way between the confronting surfaces of the end members has a greater thickness than one or more of the interleaves which lies closest to at least one of the end members. The confronting surfaces, elastomeric layers and reinforcing interleaves may each be of annular part-spherical shape.

21 Claims, 4 Drawing Sheets

ELASTOMERIC BEARING

This application is a continuation of Ser. No. 07/704,399, filed May 23, 1991, now abandoned.

BACKGROUND OF THE INVENTION

This invention relates to an elastomeric bearing and in particular, although not exclusively, to a heavy duty part-spherical type bearing for accommodating relative conical movement between two components.

In the construction of underwater oil well pipelines connecting to a floating structure it is often necessary to incorporate heavy duty elastomeric bearings to accommodate the effect of movement of a floating platform relative to the sea bed without undue strain on interconnecting pipework.

A similar requirement for heavy duty elastomeric bearings arises also in relation to tether lines for mooring floating platform structure.

In one known form of elastomeric bearing an annular element of elastomeric material is provided between confronting annular faces of a pair of rigid members; typically those faces are inclined to both the longitudinal axis of the bearing and a plane perpendicular thereto and commonly are of a part-spherical shape. To ensure an ability for the elastomeric material to withstand high compressive loads it is known that reinforcing metal interleaves may be provided in the elastomeric material, typically to lie in planes substantially parallel with the aforementioned inclined faces of the rigid members. Said reinforcing interleaves serve to transmit forces between successive elastomeric layers and do not directly transmit forces to or from structure external of the bearing.

In this construction the metal interleaves prevent over-stressing of the elastomeric material interleaves interposed therebetween but themselves become subject to high stress by virtue of variations of the hydrostatic pressure in the elastomeric layers between which a metal interleaf is interposed. Especially if the bearing is required to accommodate a large degree of conical movement and/or is subject to a large number of cycles of conical movement there is a risk of failure of the metal interleaf.

The potential problem of failure of a metal layer interleaf is not confined to elastomeric bearings comprising an annular element of elastomeric material. Thus, in chevron type springs comprising a pair of rigid end members of V-shape in section and having sandwiched therebetween a layer of elastomeric material of V-shape in form, it is known to provide within the elastomeric material interleaving reinforcing metal layers each in the form of metal plates bent to a V-shape. It is found that fatigue failure of those plates also can arise.

SUMMARY OF THE INVENTION

The present invention seeks to provide an elastomeric bearing of a kind comprising non-planar reinforcing interleaf layers in which the problem of over-stressing of the interleaf layers is mitigated or overcome.

In accordance with one of its aspects the present invention provides an elastomeric bearing comprising a pair of rigid members defining a pair of confronting and spaced apart bearing surfaces between which there is provided a non-planar element of elastomeric material, the elastomeric material having embedded therein a plurality of reinforcing interleaves of substantially rigid material each arranged to lie in a respective plane which is generally parallel in cross-section with said confronting surfaces and arranged to be acted upon substantially only by forces from said elastomeric material, wherein one or more of the reinforcing interleaves lying substantially mid-way between the confronting surfaces of the rigid members has a greater thickness than one or more of the reinforcing interleaves which lies closest to at least one of said confronting surfaces.

To ensure maintenance of a required relative orientation of the layers of elastomeric material and reinforcing interleaves it is envisaged that normally those layers may be bonded to one another.

While at a minimum the invention provides an elastomeric bearing in which only two reinforcing interleaves are provided, with that closest to one of said confronting surfaces being of smaller thickness than the other, it is envisaged that typically the elastomeric bearing shall comprise at least seven and more typically at least twelve reinforcing interleaves.

The thickness of the reinforcing interleaves may vary progressively, increasing gradually from that interleaf nearest to a confronting surface to a maximum thickness for that interleaf which lies at or substantially at a position mid-way between the confronting surfaces. Alternatively a or a group of reinforcing interleaves nearest one of said confronting surfaces may be of a first thickness and a or a second group at or substantially at a position mid-way between the confronting surfaces may be of a second thickness which is greater than said first thickness.

The interleaves may vary in thickness in an asymmetric manner. The thickest layer may lie offset from a position at or substantially at the mid-way position. A layer nearest one confronting surface may be thicker than that nearest the other confronting surface.

The invention particularly envisages that three groups of reinforcing interleaves will be provided, two groups being provided one each in the vicinity of a respective confronting surface and all of a common smaller thickness in comparison with a third group of two or more interleaves provided between said first groups and of a second, greater thickness than the interleaves of the first groups. Alternatively one of said two groups may comprise layers thinner than the other of said two groups and thinner than the third group.

The interleaves may be spaced by layers of elastomeric material each of a uniform thickness or said layers also may vary in thickness.

Each confronting surface may comprise, for example, a pair of flat faces angled relative to one another thereby to provide a V-shape in cross-section, there being provided between said confronting surfaces a plurality of layers of elastomeric material and interposed reinforcing interleaves also of a V-shape in cross-section. The invention is, however, particularly applicable to elastomeric bearings of a kind in which said confronting surfaces are of an annular form, which may be cylindrical, frusto-conical or part-spherical shape.

Each reinforcing interleaf may be of uniform thickness over its entire area or its thickness may be selectively varied, it being preferred in that case that the thickness is greater at regions of the layer at its periphery than regions lying centrally.

Suitable materials for the reinforcing interleaves include substantially rigid materials such as steel, and for example layers of aromatic polyamide such as Kevlar, of carbon fibre reinforced plastics or other composites and thermoplastics.

Particularly where the material of the reinforcing interleaves or the bond therebetween is likely to suffer degradation when exposed to the expected operating environment of the bearing, the elastomeric material forming the interlayers may be arranged to extend over the otherwise exposed edges of the reinforcing interleaves; alternatively those exposed edges may be covered by a sealing layer of another, typically elastomeric, material. Especially, but not only, in this construction it is envisaged that in use of the bearing unit the reinforcing interleaves will be free from any direct contact with structure external of the bearing unit.

BRIEF DESCRIPTION OF THE DRAWINGS

One embodiment of the present invention will now be described, by way of example only, with reference to the accompanying diagrammatic drawings in which.

DETAILED DESCRIPTION OF PREFERRED EMBODIMENT

Figure 1:
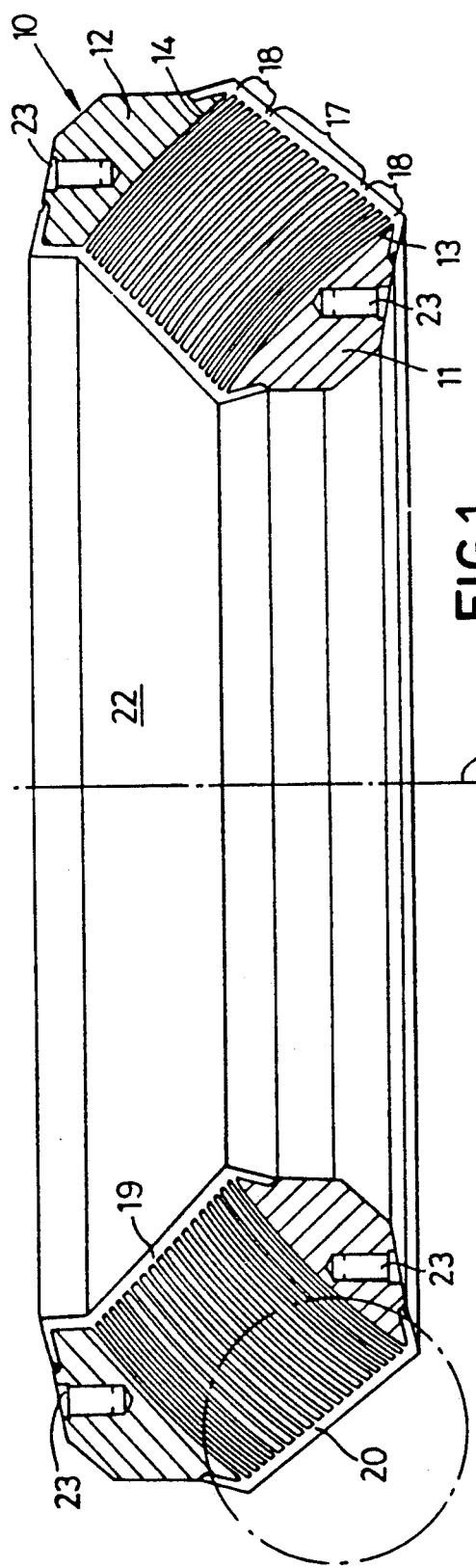
FIG. 1 is a longitudinal section through a part-spherical elastomeric bearing of the present invention.

FIG. 1 shows in longitudinal cross-section a heavy duty elastomeric bearing unit for use in accommodating relative conical movement between a sea bed structure (not shown) and a tether tube (not shown) which extends to a floating platform structure movable relative to the sea bed location of the bearing unit. The tethering arrangement of such a platform typically results in the elastomeric bearing unit being exposed to relative conical movement.

The elastomeric bearing unit 10 comprises annular inner and outer rigid end members 11,12 which define confronting bearing surfaces 13,14 each of a part-spherical shape. The surface 14 of the outer rigid member 12 is of a concave form and that 13 of the inner rigid member is of a convex shape, each of the surfaces 13,14 having a common centre of curvature which is coincident with the longitudinal axis 21 of the bearing unit.

Interposed between the rigid members 11,12 is a reinforced elastomeric assembly comprising layers 15 of elastomeric material which are in turn interposed between and bonded to metal reinforcing interleaves 16. In this construction eighteen metal interleaves are provided and arranged in three groups 17,18. Two of the groups each comprise four reinforcing interleaves 16a each of a thickness 5.8 mm while a third group comprises ten reinforcing interleaves 16b each of a thickness of 9.2 mm. The thicker layers 16b are arranged in a group 17 which lies interposed between the other two groups 18 which are thus substantially adjacent respective confronting surfaces 13,14. Each reinforcing interleaf 16a,16b is of a uniform thickness over its entire area. Also each interposed layer 15 of elastomeric material is of a uniform thickness and each of the layers 15 is of the same thickness.

The elastomeric material of the layers 15 extends around the inner and outer peripheries of the metal reinforcing interleaves 16 to provide protective layers 19,20 to protect the exposed edges of the reinforcing interleaves and the bonded interfaces from degradation by fluid passing through the opening 22 defined by the annular bearing or fluid surrounding the outer surface of the bearing. Each reinforcing interleaf 16 is acted upon only by forces arising from or transmitted by said elastomeric material.

The inner and outer rigid members 11,12 are provided with tapped bores 23 to facilitate location of the bearing unit relative to a sea bed structure and tether tube.

Figure 2:
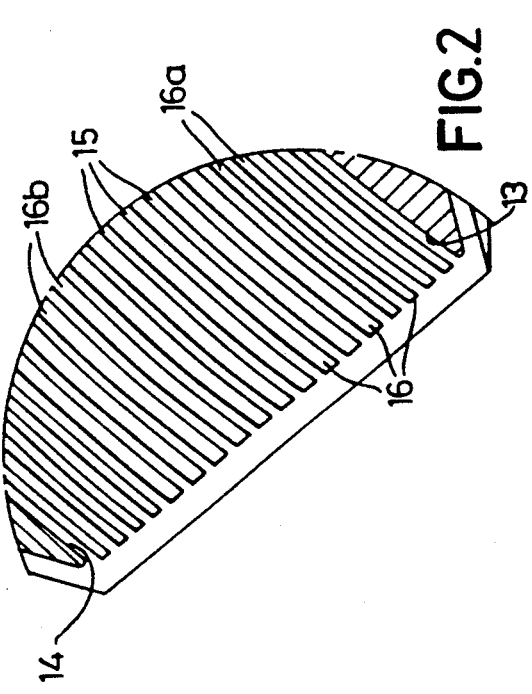
FIG. 2 is an enlarged view of the encircled part of FIG. 1, and FIGS. 3, 4 and 5 each show part longitudinal sections through part spherical elastomeric bearings in accordance with other embodiments of the present invention.
Figure 3:
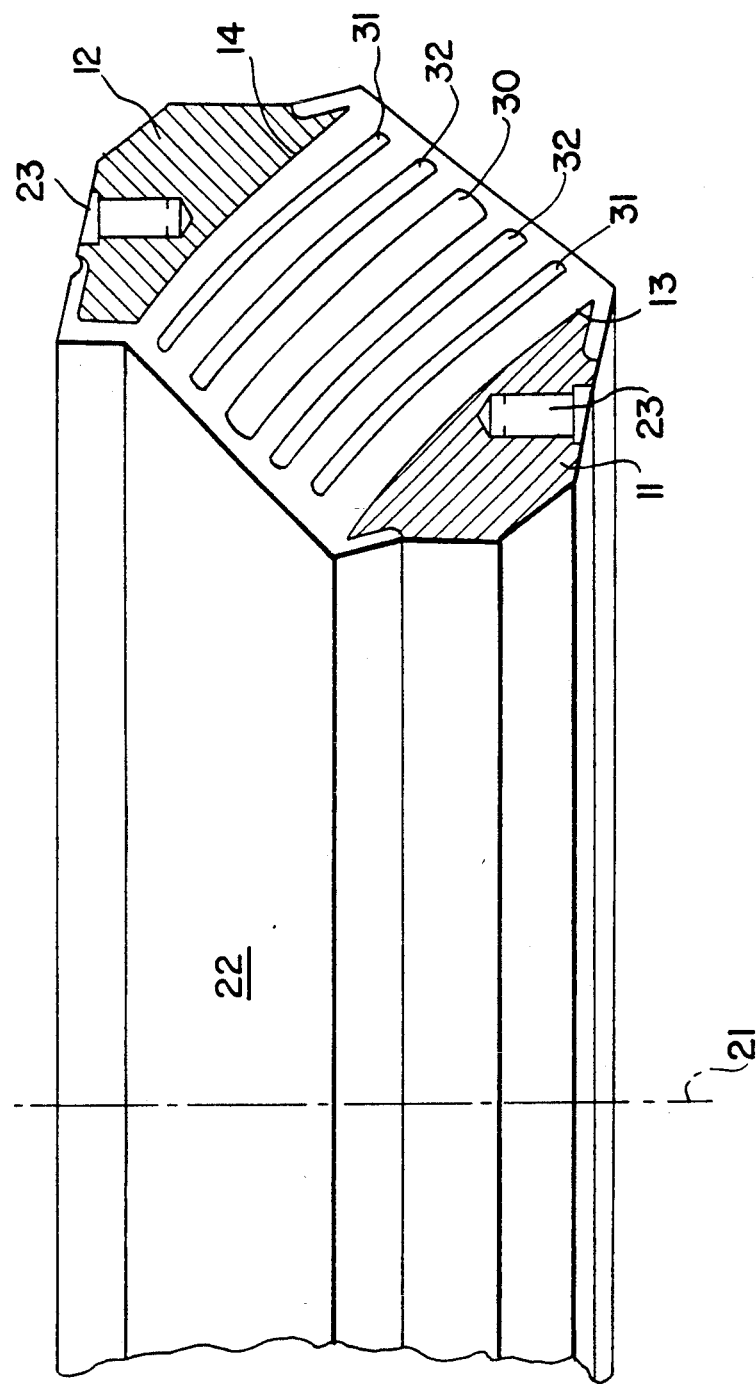

FIG. 3 shows an elastomeric bearing similar to that of FIGS. 1 and 2 but with a different arrangement of metal interleaves 30-32. A central interleaf 30 is the thickest. The end interleaves 31 nearest the rigid end members 11,12 are thinnest and the other two layers 32 lying immediately either side of the central layer 30 are of an intermediate thickness. Thus the thickness of the interleaves 30,31,32 varies progressively and in this embodiment is greatest at a position mid-way between the confronting surfaces 13,14.

Figure 4:
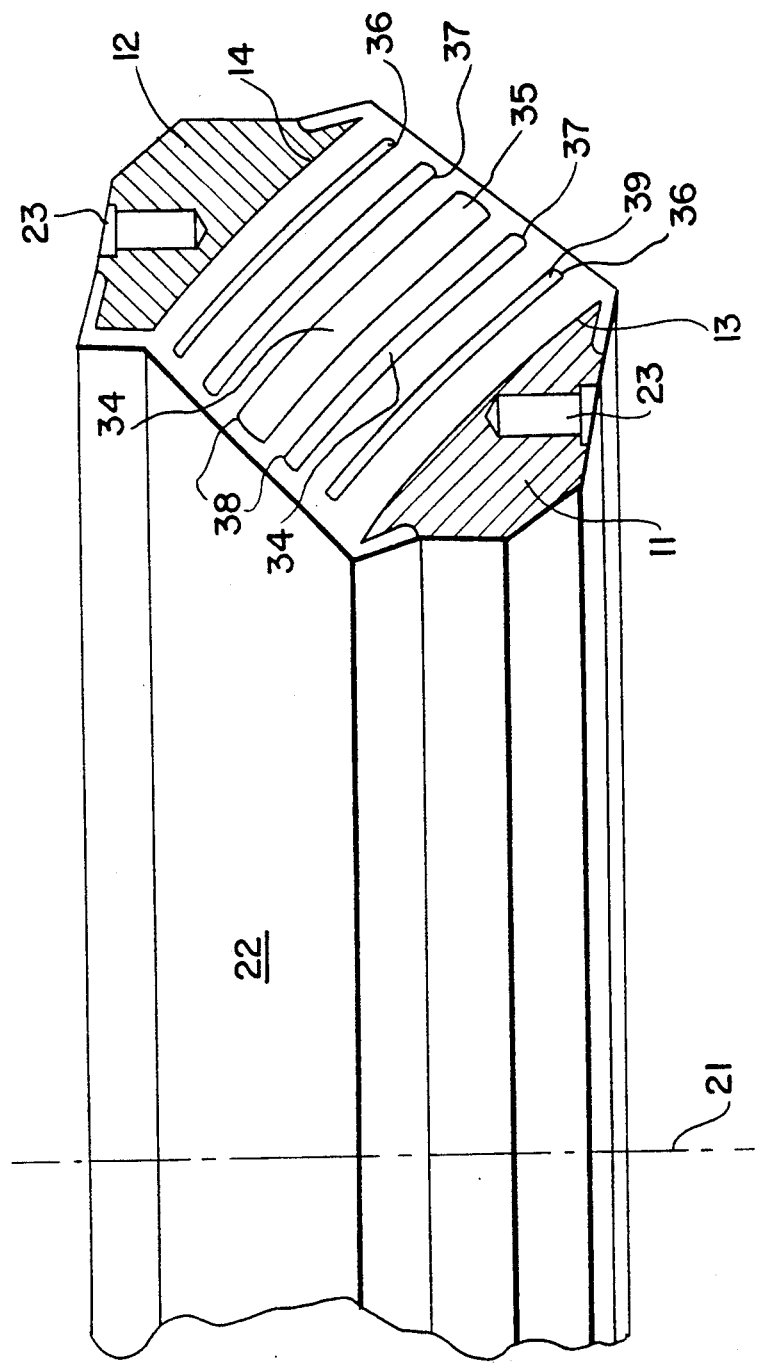

FIG. 4 shows a variation of the embodiment of FIG. 3 and in which each of the interleaves 35,36 and 37 is of a kind which varies in thickness over its area, each being thicker at inner and outer peripheral regions 38,39 than at a central region 34. The layers 35,36 and 37 otherwise correspond substantially with the layers 30,31 and 32 respectively of FIG. 3 in features such as spacing.

Figure 5:
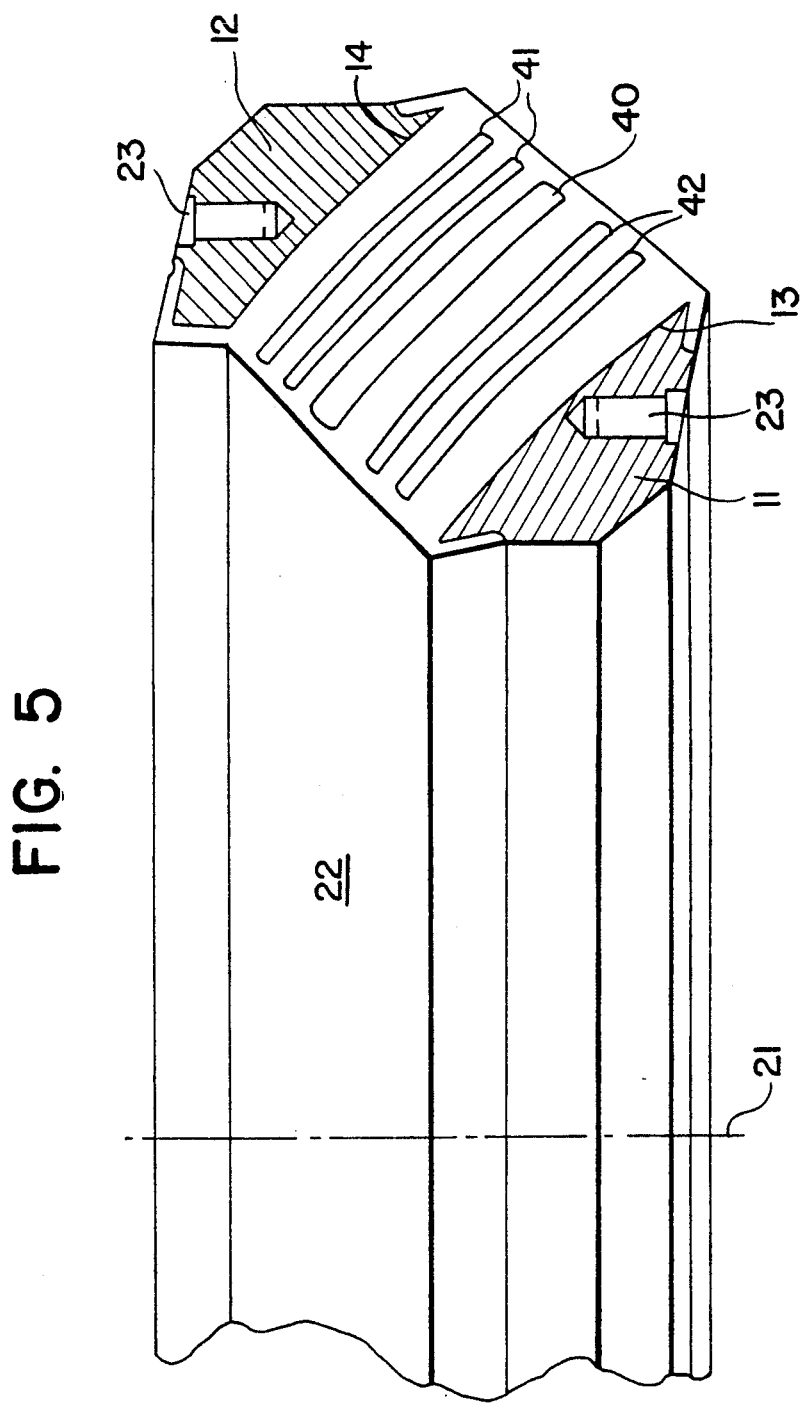

Another interleaved configuration is shown in FIG. 5. This is of an asymmetric type in which the central and thickest metal interleaf 40 lies displaced from a position mid-way between the confronting surfaces 13,14 and is nearest the surface 14. It is also asymmetric because the two interleaves 41 nearest the surface 14 are thinner than the two interleaves nearest the surface 13.

In each of FIGS. 3 to 5 for convenience and clarity only five interleaf layers have been shown. The invention envisages that a greater number of layers may be provided. For example two or more instead of one may be of a greatest thickness and layers of more than three different thicknesses may be utilized.

What I claim is:

1. An annular elastomeric bearing for withstanding high compression load in a longitudinal direction of the bearing comprising a pair of rigid members defining a pair of confronting and spaced apart annular bearing surfaces which are disposed symmetrically about a longitudinal axis parallel with said longitudinal direction, a non-planar annular element of elastomeric material provided between said confronting surfaces, the elastomeric material having embedded therein a plurality of annular reinforcing interleaves of substantially rigid material each arranged to lie in a respective plane which is generally parallel in cross-section with said confronting surfaces and arranged to be acted upon only by forces from said elastomeric material, at least one of the reinforcing interleaves lying substantially mid-way between the confronting surfaces of the rigid members having a greater thickness than at least one of the reinforcing interleaves which lies closest to at least one of said confronting surfaces and the element of elastomeric material and the embedded reinforcing interleaves each having, as considered about said longitudinal axis, a radial extent which is greatest at one axial end and a minimum at the other axial end.

2. An elastomeric bearing according to claim 1 wherein a or a group of reinforcing interleaves nearest one of said confronting surfaces is of a first thickness and a or a second group at or substantially at a position mid-way between the confronting surfaces is of a second thickness greater than said first thickness.

3. An elastomeric bearing according to claim 2 wherein three groups of reinforcing interleaves are provided, two groups being provided one each in the vicinity of a respective confronting surface and all of a common thickness which is smaller in comparison with the thickness of the interleaves of a third group of two or more interleaves provided between said two groups.

4. An elastomeric bearing according to claim 1 wherein the thickness of the reinforcing interleaves varies progressively, the thickness of an interleaf at or substantially at a position mid-way between the confronting surfaces being greater than the thickness of an interleaf nearest to a confronting surface.

5. An elastomeric bearing according to claim 1 and comprising at least seven reinforcing interleaves.

6. An elastomeric bearing according to claim 5 and comprising at least twelve reinforcing interleaves.

7. An elastomeric bearing according to claim 1 wherein the elastomeric material of the bearing is bonded to said confronting surfaces and to surfaces of the reinforcing interleaves.

8. An elastomeric bearing according to claim 1 wherein the interleaves are spaced by layers of elastomeric material each of a uniform thickness.

9. An elastomeric bearing according to claim 1 wherein each reinforcing interleaf is of a uniform thickness over its entire area.

10. An elastomeric bearing according to claim 1 wherein a reinforcing interleaf varies in thickness over its area.

11. An elastomeric bearing according to claim 10 wherein said layer is thicker at peripheral regions than regions lying centrally thereof.

12. An elastomeric bearing according to claim 1 wherein said confronting surfaces are of annular form.

13. An elastomeric bearing according to claim 12 wherein said confronting surfaces are of frusto-conical form.

14. An elastomeric bearing according to claim 12 wherein said confronting surfaces are of part-spherical form.

15. An elastomeric bearing according to claim 1 wherein elastomeric material extends over edges of the reinforcing interleaves.

16. An elastomeric bearing according to claim 15 wherein the elastomeric material extending over edges of the reinforcing interleaves is integral with the elastomeric material lying between the reinforcing interleaves.

17. An elastomeric bearing according to claim 1 wherein the interleaves vary in thickness in an asymmetric manner as considered in relation to the positions of the interleaves between the confronting surfaces of the rigid members.

18. An elastomeric bearing comprising a pair of rigid members defining a pair of confronting and spaced apart bearing surfaces between which there is provided a non-planar element of elastomeric material, the elastomeric material having embedded therein a plurality of reinforcing interleaves of substantially rigid material each arranged to lie in a respective plane which is generally parallel in cross-section with said confronting surfaces and arranged to be acted upon only by forces from said elastomeric material, wherein there are three groups of interleaves with a third group thereof lying substantially mid-way between the confronting surfaces of the rigid members and two groups are provided one each in the vicinity of a respective confronting surface and all of a common thickness which is smaller in comparison with the thickness of the interleaves of said third group of two or more interleaves provided between said two groups.

19. An elastomeric bearing comprising a pair of rigid members defining a pair of confronting and spaced apart bearing surfaces between which there is provided a non-planar element of elastomeric material, the elastomeric material having embedded therein a plurality of reinforcing interleaves of substantially rigid material each arranged to lie in a respective plane which is generally parallel in cross-section with said confronting surfaces and arranged to be acted upon only by forces from said elastomeric material, wherein at least one of the reinforcing interleaves lying substantially mid-way between the confronting surfaces of the rigid members has a greater thickness than at least one of the reinforcing interleaves which lies closest to at least one of said confronting surfaces and at least one of the interleaves varies in thickness over its area so as to be thicker at peripheral regions than regions lying centrally thereof.

20. An elastomeric bearing comprising a pair of rigid members defining a pair of confronting and spaced apart bearing surfaces between which there is provided a non-planar element of elastomeric material, the elastomeric material having embedded therein a plurality of reinforcing interleaves of substantially rigid material each arranged to lie in a respective plane which is generally parallel in cross-section with said confronting surfaces and arranged to be acted upon only by forces from said elastomeric material, wherein at least one of the reinforcing interleaves lying substantially mid-way between the confronting surfaces of the rigid members has a greater thickness than at least one of the reinforcing interleaves which lies closest to at least one of said confronting surfaces and wherein the interleaves vary in thickness in an asymmetric manner as considered in relation to the positions of the interleaves between the confronting surfaces of the rigid members.

21. An elastomeric bearing comprising a pair of rigid members defining a pair of confronting and spaced apart bearing surfaces between which there is provided a non-planar element of elastomeric material, the elastomeric material having embedded therein a plurality of reinforcing interleaves of substantially rigid material each arranged to lie in a respective plane which is generally parallel in cross-section with said confronting surfaces and arranged to be acted upon only by forces from said elastomeric material, wherein there are three groups of interleaves with a third group thereof lying substantially mid-way between the confronting surfaces of the rigid members and two groups are provided one each in the vicinity of a respective confronting surface with the interleaves thereof having a thickness which is smaller in comparison with the thickness of the interleaves of said third group of two or more interleaves provided between said two groups.

* * * * *